(12) United States Patent
Jun et al.

(10) Patent No.: US 7,920,219 B2
(45) Date of Patent: Apr. 5, 2011

(54) LIQUID CRYSTAL DISPLAY DEVICE AND METHOD OF MANUFACTURING THE SAME

(75) Inventors: Sahng Ik Jun, Yongin-si (KR);
Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 611 days.

(21) Appl. No.: 11/928,313

(22) Filed: Oct. 30, 2007

(65) Prior Publication Data
US 2008/0129907 A1 Jun. 5, 2008

(30) Foreign Application Priority Data

Oct. 30, 2006 (KR) .................. 10-2006-0105656
Dec. 11, 2006 (KR) .................. 10-2006-0125332

(51) Int. Cl.
G02F 1/13 (2006.01)
G02F 1/1343 (2006.01)
G02F 1/1368 (2006.01)
(52) U.S. Cl. ...... 349/38; 349/144; 438/30; 257/E21.535
(58) Field of Classification Search .................. None
See application file for complete search history.

(56) References Cited

U.S. PATENT DOCUMENTS

| 7,760,311 | B2 * | 7/2010 | Chung et al. | 349/144 |
|---|---|---|---|---|
| 2005/0030459 | A1 * | 2/2005 | Song et al. | 349/129 |
| 2006/0050208 | A1 | 3/2006 | Enomoto et al. | |
| 2006/0164352 | A1 * | 7/2006 | Yoo et al. | 345/87 |
| 2007/0013854 | A1 * | 1/2007 | Yoo et al. | 349/143 |
| 2008/0002076 | A1 * | 1/2008 | Yagi et al. | 349/39 |
| 2008/0002089 | A1 * | 1/2008 | Lee et al. | 349/48 |

FOREIGN PATENT DOCUMENTS

| CN | 1773601 A | 5/2006 |
|---|---|---|
| CN | 1828395 A | 9/2006 |

* cited by examiner

*Primary Examiner* — Michelle R Connelly Cushwa
(74) *Attorney, Agent, or Firm* — Cantor Colburn LLP

(57) ABSTRACT

A liquid crystal display ("LCD") device includes a first thin film transistor ("TFT") applying a high gray-scale data signal supplied from a first data line to a first pixel electrode, an upper electrode connected to the first pixel electrode through a first contact hole, and directly connected to the first TFT, a first storage capacitor storing the high gray-scale data signal, a second TFT applying a low gray-scale data signal supplied from a second data line to a second pixel electrode through a second contact hole, an upper electrode connected to the second pixel electrode through a third contact hole, and a second storage capacitor storing the low gray-scale data signal.

23 Claims, 17 Drawing Sheets

LIQUID CRYSTAL DISPLAY DEVICE AND METHOD OF MANUFACTURING THE SAME

The present application claims priority to and benefit of Korean Patent Application Nos. 10-2006-0125332, filed on Dec. 11, 2006, and 10-2006-0105656, filed on Oct. 30, 2006, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD") device and method of manufacturing the same, and more particularly, to an LCD device capable of reducing a channel short phenomenon and a method of manufacturing the LCD device.

2. Description of the Related Art

A liquid crystal display ("LCD") device displays an image by controlling light transmittance by driving liquid crystal molecules of a liquid crystal layer in response to an electric field. The LCD device has a relatively narrow viewing angle as compared with other types of display devices because the LCD device may display an image by transmitting light in a direction unshielded by the liquid crystal layer.

Wide viewing angle technology of the LCD device typically uses a vertical alignment ("VA") mode. In the VA mode, liquid crystal molecules of negative dielectric anisotropy are vertically aligned and driven vertically with respect to an electric field direction to control the light transmittance. According to domain forming methods, the VA mode can be divided into multi-domain vertical alignment ("MVA") technology, patterned-ITO vertical alignment ("PVA") technology and S-patterned-ITO vertical alignment ("S-PVA") technology.

The MVA technology is a VA mode using protrusions. In the MVA technology, the liquid crystal molecules are symmetrically pre-tilted around the protrusions which are formed on an upper substrate and a lower substrate. When voltage is applied to the liquid crystal molecules, the liquid crystal molecules of the liquid crystal layer can be driven in a pre-tilted direction to form a multi-domain.

The PVA technology is a VA mode using a slit pattern. In the PVA technology, the slit pattern is formed at a common electrode of the upper substrate and a pixel electrode of the lower substrate. The slit pattern generates a fringe electric field so that the liquid crystal molecules are driven symmetrically around the slit pattern in response to a fringe electric field to form a multi-domain.

The S-PVA technology divides one pixel into a high gray-scale sub-pixel and a low gray-scale sub-pixel to display a data signal in response to different gamma curves, and independently drives each sub-pixel by a high gray-scale transistor and a low gray-scale transistor.

BRIEF SUMMARY OF THE INVENTION

A channel short defect caused by electrostatic charges may occur during a manufacturing process of an LCD device using S-PVA technology. Particularly, the channel of a high gray-scale transistor may be shorted by electrostatic charges so that a manufacturing yield of the LCD device may be decreased.

Exemplary embodiments of the present invention provide an LCD device capable of reducing a channel short defect, and a method for manufacturing the LCD device. According to the present invention, a drain electrode of a transistor which switches a high gray-scale data signal is electrically connected to an upper electrode of a storage capacitor.

In exemplary embodiments of the present invention, an LCD device includes a first thin film transistor ("TFT") supplying a first data signal supplied from a first data line to a first pixel electrode, a first storage capacitor including an electrode connected to the first pixel electrode through a first contact hole and connected to the first TFT and storing the first data signal, a second TFT supplying a second data signal supplied from a second data line to a second pixel electrode through a second contact hole, and a second storage capacitor including an electrode connected to the second pixel electrode through a third contact hole and storing the second data signal.

The first data signal and the second data signal may be generated by different gamma curves.

The first TFT may include a source electrode connected to the first data line and a drain electrode directly connected to the electrode of the first storage capacitor. The second TFT may include a source electrode connected to the second data line and a drain electrode connected to the second pixel electrode.

A capacitance of the first storage capacitor may larger than a capacitance of the second storage capacitor.

The first TFT may supply the first data signal to the first pixel electrode during a portion of one horizontal period, and the second TFT may supply the second data signal to the second pixel electrode during a remaining portion of the horizontal period.

The electrode of the first storage capacitor may be integrally connected to a drain electrode of the first TFT, and a channel short defect of the first TFT caused by electrostatic charges may be reduced by storing the electrostatic charges in the first storage capacitor before inflowing into the first TFT.

In other exemplary embodiments of the present invention, an LCD device includes a first TFT applying a first data signal supplied from a first data line to a first pixel electrode connected through a first contact hole, a first storage capacitor having an electrode connected to the first pixel electrode through the first contact hole, a second storage capacitor having an electrode connected to the first pixel electrode through a second contact hole and storing the first data signal, a second TFT applying a second data signal supplied from a second data line to a second pixel electrode connected through a third contact hole, a third storage capacitor having an electrode connected to the second pixel electrode through the third contact hole, and a fourth storage capacitor having an electrode connected to the second pixel electrode through a fourth contact hole and storing the second data signal.

In other exemplary embodiments of the present invention, an LCD device includes a data driver supplying a first data signal to a first data line and supplying a second data signal to a second data line, a gate driver supplying a gate driving signal to a gate line, a first TFT supplying the first data signal to a first pixel electrode in response to the gate driving signal, a first storage capacitor connected to the first pixel electrode through a first contact hole and directly connected to the first TFT and storing the first data signal, a second TFT supplying a second data signal to a second pixel electrode through a second contact hole in response to the gate driving signal, and a second storage capacitor connected to the second pixel electrode through a third contact hole and storing the second data signal.

The first data signal and the second data signal may be generated by different gamma curves. The LCD device may further include a gamma voltage generator supplying a first gray-scale gamma voltage to generate the first data signal and a second gray-scale gamma voltage to generate the second data signal to the data driver.

The data driver may supply the first data signal to the first TFT during a portion of a horizontal period and the second data signal to the second TFT during a remaining portion of the horizontal period, and the gate driver may supply the gate driving signal to the first TFT and the second TFT during the horizontal period.

The electrode of the first storage capacitor may be integrally connected to a drain electrode of the first TFT, and a channel short defect of the first TFT caused by electrostatic charges is reduced by storing the electrostatic charges in the first storage capacitor before inflowing into the first TFT.

In still other exemplary embodiments of the present invention, an LCD device includes a plurality of pixels connected to a plurality of first data lines to transmit a first data signal, connected to a plurality of second data lines to transmit a second data signal, and connected to a plurality of gate lines to transmit a gate driving signal. At least one pixel among the plurality of pixels includes a first pixel electrode displaying a first data signal, a first TFT supplying the first data signal to the first pixel electrode, a first storage capacitor connected to the first pixel electrode through a first contact hole and directly connected to the first TFT, the first storage capacitor storing the first data signal, a second pixel electrode displaying a second data signal, a second TFT connected to the second pixel electrode through a second contact hole, the second TFT supplying the second data signal to the second pixel electrode, and a second storage capacitor connected to the second pixel electrode through a third contact hole, the second storage capacitor storing the second data signal.

The first data signal and the second data signal may be generated by different gamma curves.

The first storage capacitor may include a first electrode, a second electrode connected to the first TFT and the first pixel electrode, and an insulating layer between the first electrode and the second electrode. The second storage capacitor may further include a third electrode connected to the first electrode, a fourth electrode connected to the second pixel electrode, and an insulating layer between the third electrode and the fourth electrode. The first electrode and the second electrode may have a larger area than an area of the third electrode and the fourth electrode of the second storage capacitor, respectively.

The second pixel electrode may be separated from the first pixel electrode and surround the first pixel electrode.

In yet still other exemplary embodiments of the present invention, a method for manufacturing an LCD device includes forming a gate line including a first gate electrode and a storage capacitor line including a first electrode on a substrate, forming an active layer on the substrate, the active layer overlapped with the first gate electrode with a gate insulating layer disposed therebetween, forming a source/drain pattern, forming an organic insulating layer on the substrate, and forming a first contact hole exposing a portion of a second electrode by removing a portion of the organic insulating layer. The source/drain pattern includes a first data line to transmit a first data signal, a first source electrode and a first drain electrode of a first TFT connected to the first data line, the second electrode opposite to the first electrode and a first drain line connecting the first drain electrode with the second electrode.

Forming the gate line may include forming a gate line including a second gate electrode and forming the storage capacitor line includes forming the storage capacitor line with a third electrode on the substrate, forming an active layer on the substrate, the active layer overlapped with the second gate electrode with a gate insulating layer disposed therebetween, forming a source/drain pattern, and forming a second contact hole exposing the second drain line connected to the second drain electrode and a third contact hole exposing a portion of a fourth electrode by removing a portion of the organic insulating layer. The source/drain pattern includes a second data line to transmit a second data signal, a second source electrode and a second drain electrode of a second TFT connected to the second data line, a fourth electrode opposite to the third electrode, and a second drain line connected to the second drain electrode.

The method for manufacturing the LCD device may further include forming a pixel electrode formed on the substrate in which the first, second, and third contact holes are formed by a transparent conductive patterning. The pixel electrode may include a first pixel electrode displaying the first data signal and a second pixel electrode displaying a low gray-scale data signal.

Forming the pixel electrode may include forming the first pixel electrode connected to the second electrode through the first contact hole, and the second pixel electrode connected to the second drain line through the second contact hole and to the fourth electrode through the third contact hole.

Forming the storage capacitor line may include forming the first electrode having a larger area than an area of the third electrode, and forming the second electrode having a larger area than an area of the fourth electrode.

In still yet other exemplary embodiments of the present invention, a method for manufacturing an LCD device includes forming a gate line on a substrate, the gate line including gate electrodes having a first gate electrode and a second gate electrode and a storage capacitor line including a first electrode and a second electrode, forming an active layer formed on the substrate, the active layer overlapped with the first gate electrode and the second gate electrode with a gate insulating layer disposed therebetween, respectively, forming a source/drain pattern, forming an organic insulating layer on the substrate and removing a portion of the organic insulating layer to form contact holes, and forming a pixel electrode on the substrate where the contact holes are formed.

The contact holes may include a first contact hole exposing the third electrode, a second contact hole exposing the drain line connected to the second drain electrode, and a third contact hole exposing the fourth electrode.

The pixel electrode may be formed by a transparent conductive patterning and include a first pixel electrode displaying the first data signal and connected to the third electrode through the first contact hole, a second pixel electrode displaying the second data signal and connected to the drain line connected to the second drain electrode through the second contact hole and to the fourth electrode through the third contact hole.

The source/drain pattern may include a first data line and second data line transmitting a first data signal and a second data signal, respectively, a first source electrode and a first drain electrode of a first TFT connected to the first data line, a second source electrode and a second drain electrode of a second TFT connected to the second data line, a third electrode and a fourth electrode opposite to the first electrode and the second electrode and a drain line connected to the first drain electrode and the third electrode.

In yet other exemplary embodiments of the present invention, an LCD device includes a first TFT supplying a first data signal supplied from a data line to a first pixel electrode in response to a first gate driving signal, a first storage capacitor storing the first data signal, and having an electrode connected to the first pixel electrode through a first contact hole and directly connected to the first TFT, a second TFT supplying a second data signal supplied from the data line to a second pixel electrode through a second contact hole in response to a second gate driving signal, and a second storage capacitor including an electrode connected to the second pixel electrode through a third contact hole, the second storage capacitor storing the second data signal.

The first data signal and the second data signal may be generated by different gamma curves. The first gate driving signal and the second gate driving signal may be applied to the first TFT and the second TFT during a horizontal period.

BRIEF DESCRIPTION OF THE DRAWINGS

Exemplary embodiments of the present invention can be understood in more detail from the following descriptions taken in conjunction with the accompanying drawings, in which.

DETAILED DESCRIPTION OF THE INVENTION

Figure 1:
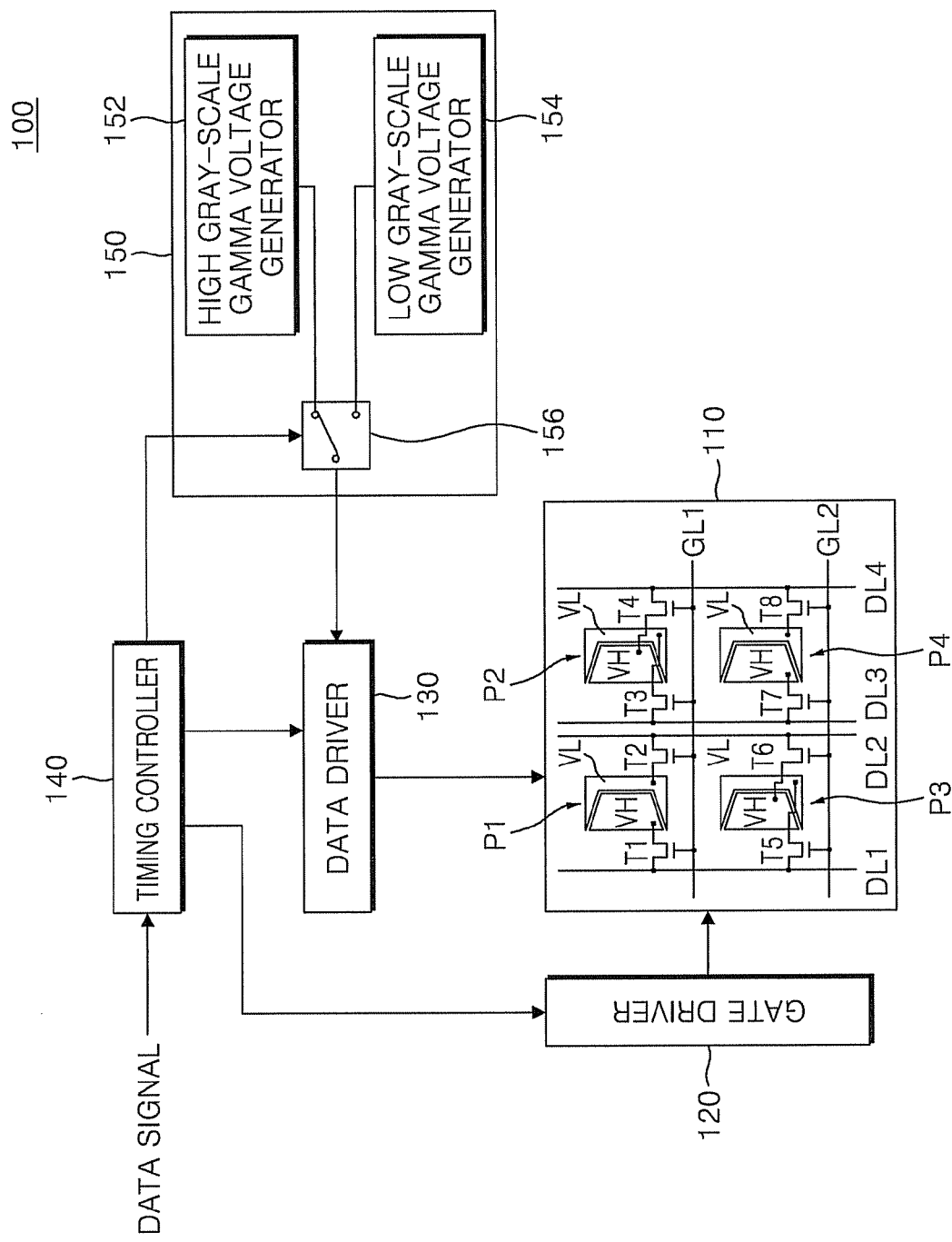
FIG. 1 is a block diagram illustrating an exemplary LCD device in accordance with an exemplary embodiment of the present invention.

The present invention is described more fully hereinafter with reference to the accompanying drawings, in which exemplary embodiments of the invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be further described with reference to the accompanying drawings.

FIG. 1 is a block diagram illustrating an exemplary liquid crystal display ("LCD") device according to an exemplary embodiment of the present invention.

Referring to FIG. 1, an LCD device 100 includes a liquid crystal panel 110, a gate driver 120 to drive gate lines GL1 and GL2 of the liquid crystal panel 110, a data driver 130 to drive data lines DL1 to DL4 of the liquid crystal panel 110, a timing controller 140 to control the gate driver 120 and the data driver 130, and a gamma voltage generator 150 to selectively provide a high gray-scale gamma voltage and a low gray-scale gamma voltage.

The liquid crystal panel 110 includes a plurality of pixels which may be arranged in a matrix configuration. While many more than four pixels may be provided in the liquid crystal panel 110, for ease of illustration, pixels P1 to P4 are shown in liquid crystal panel 110. The pixel P1 includes first and second pixel electrodes VH and VL, first and second thin film transistors ("TFTs") T1 and T2, a gate line GL1, and data lines DL1 and DL2. The first and second pixel electrodes VH and VL are formed in a high gray-scale area and a low gray-scale area, respectively, and the first and second TFTs T1 and T2 are connected to the first and second pixel electrodes VH and VL. The gate line GL1 is connected to the first and second TFTs T1 and T2 and the data lines DL1 and DL2 are connected to the first and second TFTs T1 and T2, respectively.

The first pixel electrode VH and the second pixel electrode VL which are formed in a high gray-scale area and a low gray-scale area, respectively display a data signal in response to gamma voltages generated by different gamma curves.

In the odd pixel P1 connected to the odd gate line GL1, the first TFT T1 is connected to the first pixel electrode VH, and the second TFT T2 is connected to the second pixel electrode VL. In the even pixel P2 connected to the odd gate line GL1, a first TFT T3 is connected to a second pixel electrode VL, and a second TFT T4 is connected to a first pixel electrode VH. Remaining odd pixels connected to odd gate lines may have substantially the same arrangement as pixel P1, and remaining even pixels connected to odd gate lines may have substantially the same arrangement as pixel P2.

In the odd pixel P3 connected to the even gate line GL2, a first TFT T5 is connected to a second pixel electrode VL, and a second TFT T6 is connected to a first pixel electrode VH. In an even pixel P4 connected to the even gate line GL2, a first TFT T7 is connected to a first pixel electrode VH, and a second TFT T8 is connected to a second pixel electrode VL. Remaining odd pixels connected to even gate lines may have substantially the same arrangement as pixel P3, and remaining even pixels connected to even gate lines may have substantially the same arrangement as pixel P4.

In the even pixels P2 and P4, the first TFTs T3 and T7 are connected to data line DL3 and the second TFTs T4 and T8 are connected to data line DL4.

The timing controller 140 generates a gate control signal to control the gate driver 120 and a data control signal to control the data driver 130 by using a synchronizing signal and a clock signal inputted from an external device. After re-arranging a data signal inputted from the external device, the timing controller 140 provides the data signal to the data driver 130. In addition, the timing controller 140 generates a switching signal to control the gamma voltage generator 150. The switching signal controls a gamma voltage switch 156 to switch outputs of a high gray-scale gamma voltage generator 152 and a low gray-scale gamma voltage generator 154 during one horizontal period. The switching signal may be selected to appropriately control output times of the high gray-scale gamma voltage generator 152 and the low gray-scale gamma voltage generator 154 during one horizontal period. Hereinafter, it is assumed that the switching signal has a high gray-scale voltage during a ½ horizontal period output from the high gray-scale gamma voltage generator 152 and a low gray-scale voltage during the remaining ½ horizontal period output from the low gray-scale gamma voltage generator 154.

More particularly, the gamma voltage generator 150 includes the high gray-scale gamma voltage generator 152 to generate a plurality of high gray-scale gamma voltages, the low gray-scale gamma voltage generator 154 to generate a plurality of low gray-scale gamma voltages, and the gamma voltage switch 156 to switch the outputs of the high and low gray-scale gamma voltage generators 152 and 154. The gamma voltage switch 156 switches the high gray-scale gamma voltage from the high gray-scale gamma voltage generator 152 during a ½ horizontal period, and switches the low gray-scale gamma voltage from the low gray-scale gamma voltage generator 154 during a remaining ½ horizontal period to supply the switched high and low gamma voltages to the data driver 130.

In response to the gate control signal from the timing controller 140, the gate driver 120 applies the gate driving signal to gate lines GL1 and GL2 of the liquid crystal panel 110, and sequentially drives the gate lines GL1 and GL2.

In response to the data control signal from the timing controller 140, the data driver 130 converts a data signal received from the timing controller 140 into a high gray-scale data signal by using the high gray-scale gamma voltage from the high gray-scale gamma voltage generator 152 during a ½ horizontal period, and provides the high gray-scale data signal to the data line DL1. The data driver 130 converts a data signal received from the timing controller 140 into a low gray-scale data signal by using the low gray-scale gamma voltage from the low gray-scale gamma voltage generator 154 during a remaining ½ horizontal period, and provides the low gray-scale data signal to the data line DL2.

Figure 2A:
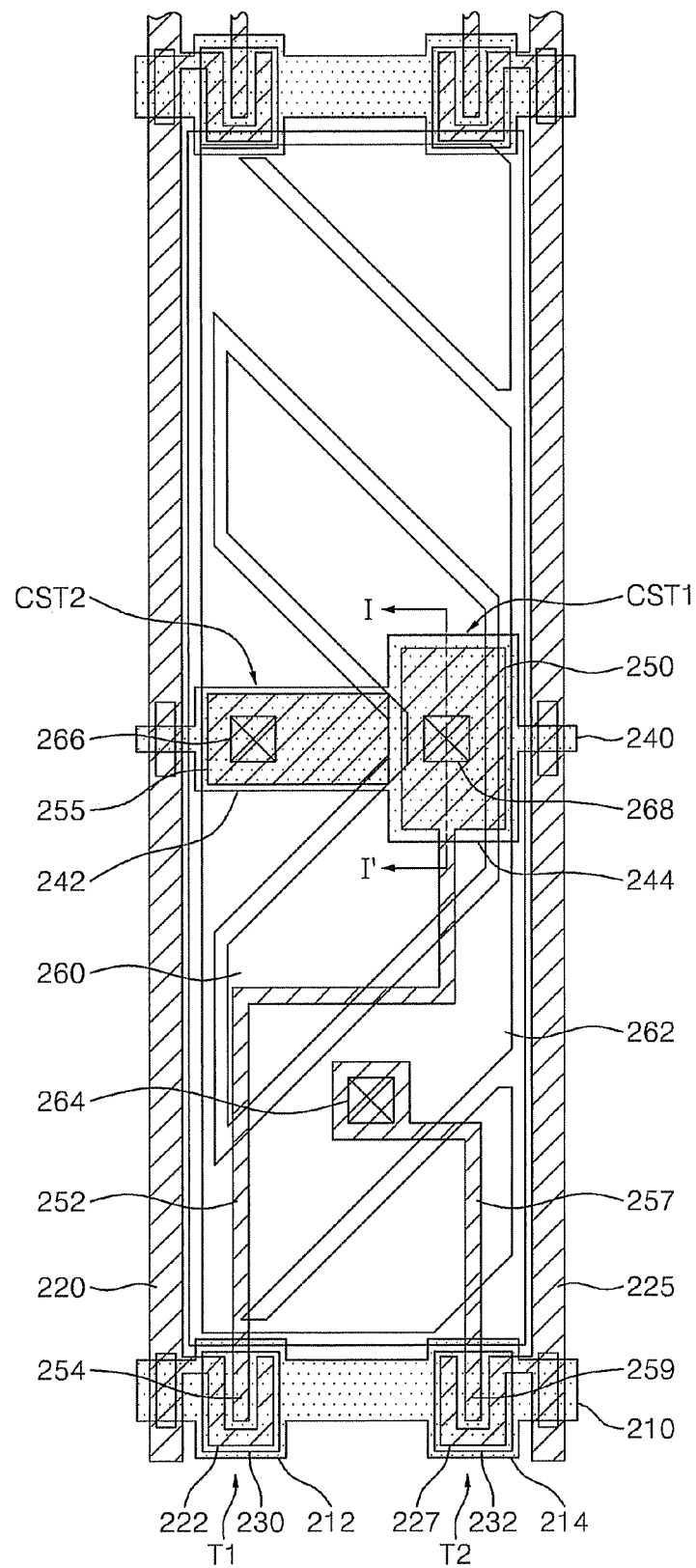
FIG. 2A is a plan view illustrating a structure of an exemplary pixel of the exemplary LCD device shown in FIG. 1.
Figure 2B:
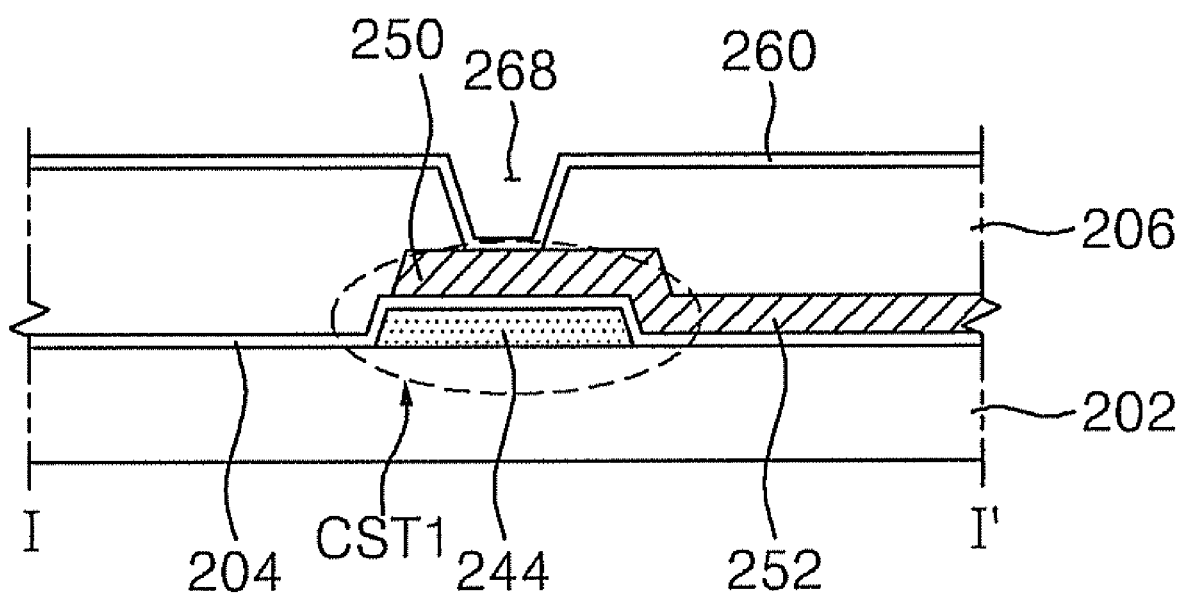
FIG. 2B is a cross-sectional view of an exemplary first storage capacitor taken along line I-I' of FIG. 2A.

Referring to FIG. 2A and FIG. 2B, a structure of an exemplary pixel of an exemplary LCD device in accordance with an exemplary embodiment of the present invention will be described in detail hereinafter.

FIG. 2A is a plan view illustrating a structure of an exemplary pixel of the exemplary LCD device shown in FIG. 1.

Referring to FIG. 2A, a pixel 200 of an LCD device in accordance with an exemplary embodiment of the present invention includes a first pixel electrode 260, a second pixel electrode 262, a first TFT T1, a second TFT T2, a gate line 210, a first data line 220, a second data line 225, a first storage capacitor CST1, and a second storage capacitor CST2.

The first pixel electrode 260 is connected to a drain electrode 254 of the first TFT T1 and to an upper electrode 250 of the first storage capacitor CST1 through a contact hole 268. The first pixel electrode 260 receives a high gray-scale data signal from the first data line 220 via the first TFT T1, and displays the high gray-scale data signal.

The second pixel electrode 262 is separated from the first pixel electrode 260, and is formed in a shape surrounding the first pixel electrode 260. The second pixel electrode 262 is connected to the drain electrode 259 of the second TFT T2 through a contact hole 264, and connected to an upper electrode 255 of the second storage capacitor CST2 through a contact hole 266. The second pixel electrode 262 receives a low gray-scale data signal from the second data line 225 via the second TFT T2, and displays the low gray-scale data signal.

The first TFT T1 includes a gate electrode 212 connected to the gate line 210, a source electrode 222 connected to the first data line 220, the drain electrode 254 connected to a drain line 252, and an active layer 230 overlapped with the gate electrode 212 with an insulating layer disposed therebetween. In response to a gate driving signal supplied from the gate line 210, the first TFT T1 provides the high gray-scale data signal supplied from the first data line 220 to the drain line 252 through the drain electrode 254 during a ½ horizontal period.

The second TFT T2 includes a gate electrode 214 connected to the gate line 210, a source electrode 227 connected to the second data line 225, a drain electrode 259 connected to a drain line 257 and an active layer 232 overlapped with the gate electrode 214 with an insulating layer disposed therebetween. In response to the gate driving signal applied from the gate line 210, the second TFT T2 provides a low gray-scale data signal supplied from the second data line 225 to the drain line 257 through the drain electrode 259 during a remaining ½ horizontal period.

The gate line 210 is connected to the gate electrode 212 of the first TFT T1, and connected to the gate electrode 214 of the second TFT T2. The gate line 210 provides the gate driving signal outputted from the gate driver 120 to the gate electrode 212 of the first TFT T1 and the gate electrode 214 of the second TFT T2.

The first data line 220 may be formed at a first side of the pixel, and intersects and is insulated from the gate line 210. The first data line 220 is connected to the source electrode 222 of the first TFT T1. The first data line 220 provides the high gray-scale data signal outputted from the data driver 130 to the source electrode 222 of the first TFT T1 during a ½ horizontal period.

The second data line 225 may be formed at a second side of the pixel, and intersects and is insulated from the gate line 210. The second data line 225 is connected to the source electrode 227 of the second TFT T2. The second data line 225 provides the low gray-scale data signal outputted from the data driver 130 to the source electrode 227 of the second TFT T2 during a remaining ½ horizontal period.

The first storage capacitor CST1 includes a lower electrode 244 connected to a storage capacitor line 240 and an upper electrode 250 overlapped with the lower electrode 244 with an insulating layer disposed therebetween. The upper electrode 250 is directly connected to the drain electrode 254 of the first TFT T1 through the drain line 252. The lower and upper electrodes 244 and 250 of the first storage capacitor CST1 have an area larger than lower and upper electrodes 242 and 255 of the second storage capacitor CST2.

The upper electrode 250 of the first storage capacitor CST1 connected to the drain line 252 is also connected to the first pixel electrode 260 through the contact hole 268. Accordingly, the high gray-scale data signal supplied from the drain line 252 connected to the drain electrode 254 of the first TFT T1 can be applied to the first pixel electrode 260, and be stored in the first storage capacitor CST1.

The second storage capacitor CST2 includes the lower electrode 242 connected to the storage capacitor line 240 and the upper electrode 255 overlapped with the lower electrode 242 with an insulating layer disposed therebetween. The upper electrode 255 of the second storage capacitor CST2 is connected to the second pixel electrode 262, which is connected to the drain electrode 259 of the second TFT T2, through the contact hole 266. Accordingly, the low gray-scale data signal supplied from the drain line 257 connected to the drain electrode 259 of the second TFT T2 can be applied to the second pixel electrode 262, and be stored in the second storage capacitor CST2.

FIG. 2B is a cross-sectional view of an exemplary first storage capacitor taken along line I-I' of FIG. 2A.

Referring to FIG. 2B, the first storage capacitor CST1 includes the lower electrode 244 formed on an insulating substrate 202, such as a glass substrate, and the upper electrode 250 overlapped with the lower electrode 244 with an insulating layer 204 disposed therebetween. The upper electrode 250 is directly connected to the drain electrode 254 of the first TFT T1 through the drain line 252, and connected to the first pixel electrode 260 through the contact hole 268 formed in an insulating layer 206.

The LCD device 100 in accordance with an exemplary embodiment of the present invention includes the first contact hole 268 to connect the drain electrode 254 of the first TFT T1, the upper electrode 250 of the first storage capacitor CST1 and the first pixel electrode 260, the second contact hole 264 to connect the drain electrode 259 of the second TFT T2 and the second pixel electrode 262, and the third contact hole 266 to connect the second pixel electrode 262 and the upper electrode 255 of the second storage capacitor CST2.

In the exemplary embodiment, the LCD device 100 has a structure in which a contact hole for directly connecting the drain electrode 254 of the first TFT T1 and the first pixel electrode 260 is not formed, and the drain electrode 254 of the first TFT T1 is connected to the upper electrode 255 of the first storage capacitor CST1. Thus, the electrostatic charges generated during a manufacturing process of the LCD device 100 are stored in the first storage capacitor CST1 before inflowing into the first TFT T1, so that an inflow path of electrostatic charges to the first TFT T1 is cut off. Accordingly, a channel short defect caused by the electrostatic charges, especially a channel short defect of a high gray-scale transistor caused by the electrostatic charges can be reduced.

In an exemplary embodiment of the present invention, a contact hole for connecting the drain electrode 254 of the first TFT T1 and the first pixel electrode 260 is not formed, and the drain electrode 254 of the first TFT T1 is directly connected to the upper electrode 250 of the first storage capacitor CST1. However, the present invention should not be limited to these exemplary embodiments. For example, the contact hole 264 for connecting the drain electrode 259 of the second TFT T2 and the second pixel electrode 262 may not be provided, and the drain electrode 259 of the second TFT T2 may be directly connected to the upper electrode 255 of the second storage capacitor CST2.

FIG. 3A to FIG. 3E are views illustrating an exemplary method for manufacturing a TFT substrate of the exemplary LCD device shown in FIG. 1. FIGS. 3A to 3E show one exemplary pixel area by way of example.

Figure 3A:
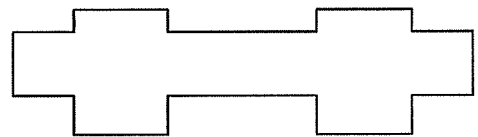
FIG. 3A to FIG. 3E are views illustrating an exemplary method for manufacturing a TFT substrate shown in FIGS. 2A and 2B.
Figure 3A:
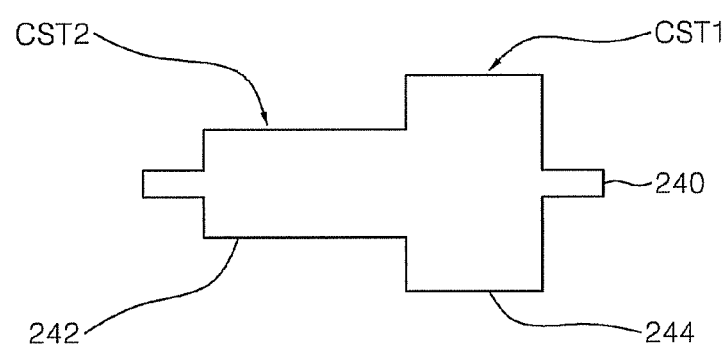
Figure 3A:
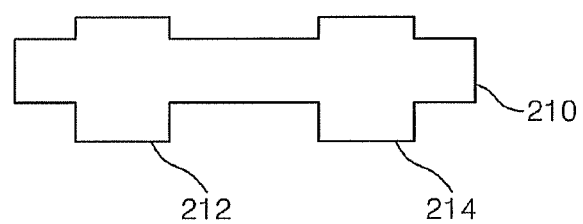

FIG. 3A shows a gate line forming process. The gate line 210 including the gate electrodes 212 and 214 and the storage capacitor line 240 including the lower electrodes 242 and 244 are formed on an insulating substrate, such as a transparent insulating substrate including a glass substrate. The storage capacitor line 240 is formed substantially parallel to the gate line 210.

More specifically, a metal layer is deposited on a glass substrate through a sputtering process or the like. The metal layer may include, for example, molybdenum (Mo), aluminum (Al), chrome (Cr), or an alloy thereof. The metal layer may include a single-layer structure or a multi-layer structure. The gate line 210 and the storage capacitor line 240 are formed by patterning the metal layer through an etching process and a photolithography process using a first mask. In an exemplary embodiment, when the metal layer is patterned, an area of the lower electrode 244 of the first storage capacitor CST1 may be larger than an area of the lower electrode 242 of the second storage capacitor CST2.

Figure 3B:
Figure 3B:
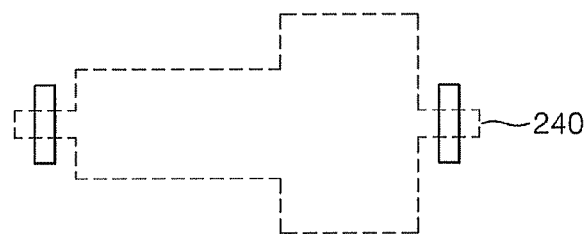
Figure 3B:
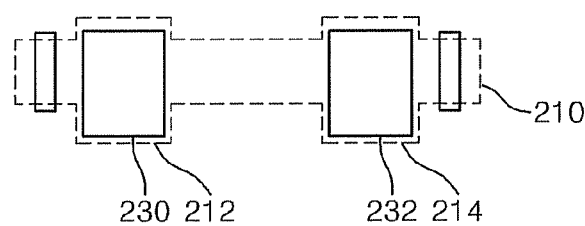

FIG. 3B shows an active layer forming process. A gate insulating layer 204 (FIG. 2B) is formed on the glass substrate in which the gate line 210 and the storage capacitor line 240 are formed, and active layers 230 and 232 overlapped with the gate electrodes 212 and 214 are formed through a second mask process. Additional active layer areas may also be formed at areas corresponding to intersections of the gate lines 210 and the storage capacitor lines 240 with overlying data lines. The active layers 230 and 232 may further include an ohmic contact layer. Specifically, the gate insulating layer 204, an amorphous silicon ("a-Si") layer and an n+ a-Si layer are sequentially formed through a deposition process, such as a plasma enhanced chemical vapor deposition ("PECVD") process, on the glass substrate processed by the first mask. And then, through the photolithography process and the etching process using the second mask, the active layers 230 and 232 including the a-Si layer and the n+ a-Si layer is formed. The gate insulating layer 204 includes an inorganic insulating material such as a silicon oxide SiOx, or a silicon nitride SiNx. In substantially the same manner, the active layers 230 and 232 may be formed at an intersection area of the gate line 210 and the data line or at an intersection area of the storage capacitor line 240 and the data line.

Figure 3C:
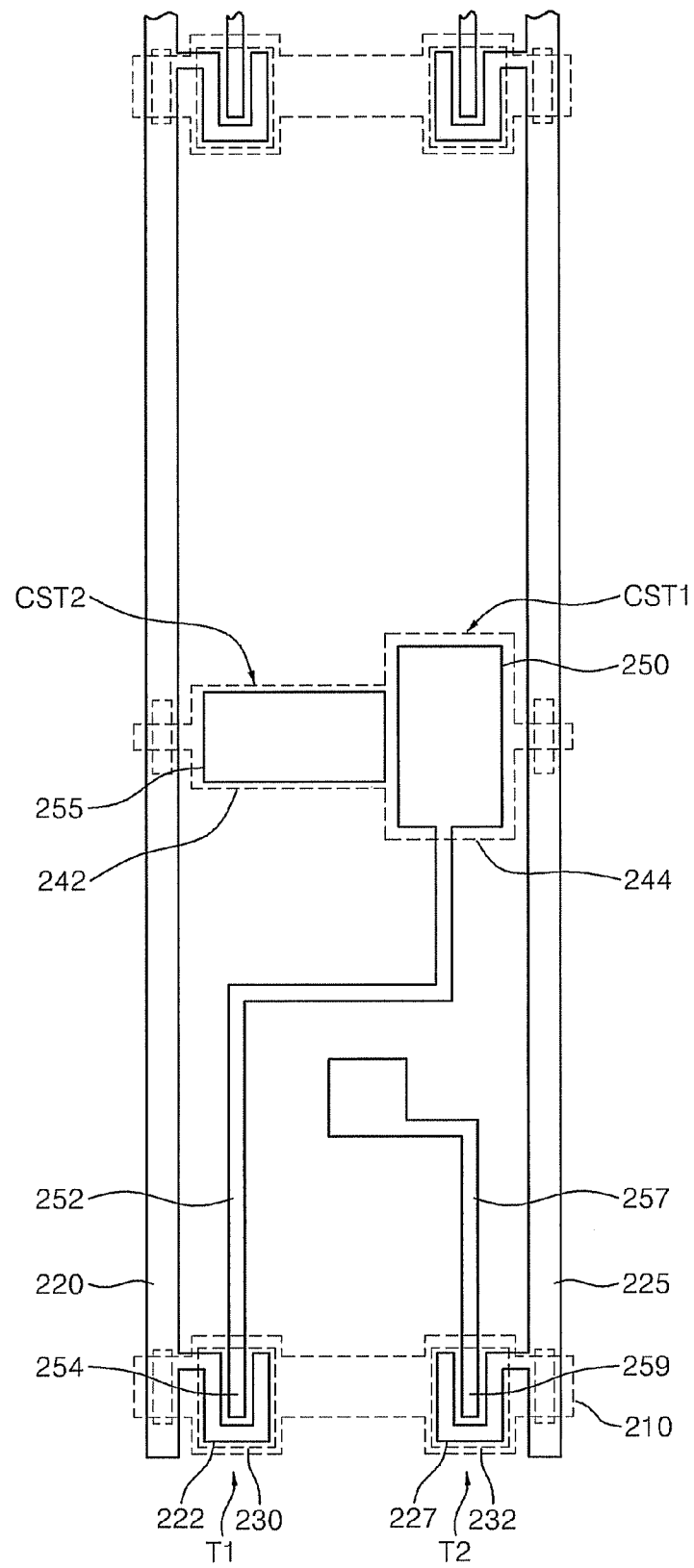

FIG. 3C shows a source/drain pattern forming process. A source/drain pattern is formed on the gate insulating layer 204 on which the active layers 230 and 232 are formed. The source/drain pattern includes the first data line 220, a source electrode 222 and a drain electrode 254 of the first TFT T1, the upper electrode 250 of the first storage capacitor CST1, a drain line 252 connecting the drain electrode 254 of the first TFT T1 to the upper electrode 250 of the first storage capacitor CST1, the second data line 225, the source electrode 227 and the drain electrode 259 of the second TFT T2, and the drain line 257 connected to the drain electrode 259 of the second TFT T2.

The first data line 220 is connected to the source electrode 222 of the first TFT T1, and the second data line 225 is connected to the source electrode 227 of the second TFT T2. The upper electrode 250 of the first storage capacitor CST1 is formed to correspond to the lower electrode 244 of the first storage capacitor CST1, and the upper electrode 255 of the second storage capacitor CST2 is formed to correspond to the lower electrode 242 of the second storage capacitor CST2. Accordingly, an area of the upper electrode 250 of the first storage capacitor CST1 is larger than that of the upper electrode 255 of the second storage capacitor CST2.

The source/drain metal layer is formed through a sputtering process on the glass substrate processed by the second mask. The source/drain metal layer is patterned through an etching process and a photolithography process using a third mask. By removing the ohmic contact layer exposed between the source electrodes 222 and 227 and the drain electrodes 254 and 259, respectively, the source electrodes 222 and 227 are electrically insulated from the drain electrodes 254 and 259. Thus, the first TFT T1 connected to the gate line 210 and the first data line 220 and the second TFT T2 connected to the gate line 210 and the second data line 225 are formed.

Figure 3D:
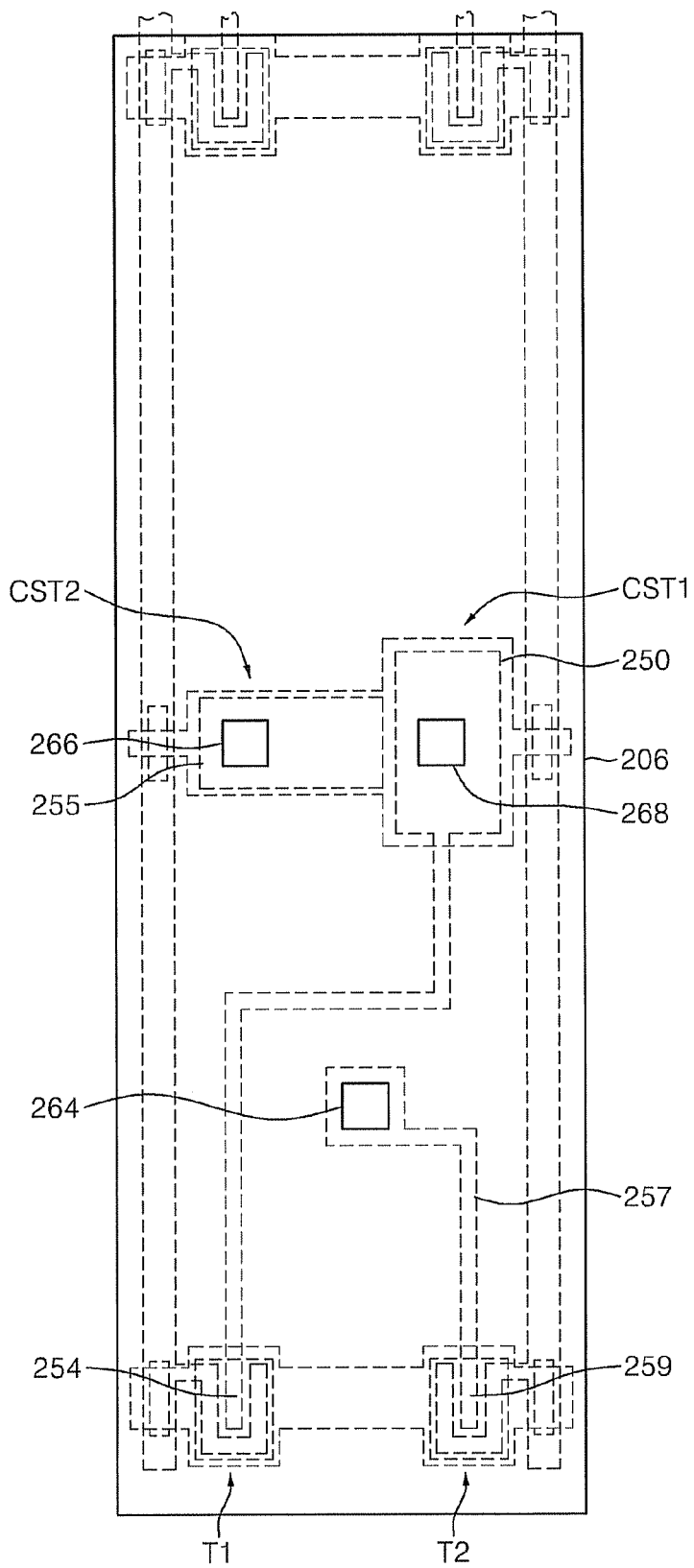

FIG. 3D shows a contact hole forming process. An organic insulating layer 206 is formed on the gate insulating layer 204 on which the source/drain pattern is formed, and the first contact hole 268, the second contact hole 264 and the third contact hole 266 are formed by removing a part of the organic insulating layer 206 through a fourth mask process. The first contact hole 268 is formed to connect the drain electrode 254 of the first TFT T1 and the upper electrode 250 of the first storage capacitor CST1 to a first pixel electrode. The second contact hole 264 is formed to connect the drain electrode 259 of the second TFT T2 to a second pixel electrode. The third contact hole 266 is formed to connect the second pixel electrode to the upper electrode 255 of the second storage capacitor CST2.

The organic insulating layer 206 is formed by coating an organic insulating material such as an acrylic organic compound on the glass substrate through a spin coating process or a spinless coating process. The first contact hole 268, the second contact hole 264 and the third contact hole 266 are formed by exposing areas of the upper electrode 250 of the first storage capacitor CST1, an end portion of the drain line 257 connected to the drain electrode 259 of the second TFT T2, and the upper electrode 255 of the second storage capacitor CST2 by removing a part of the organic insulating layer 206 through an etching process and a photolithography process using a fourth mask.

Figure 3E:
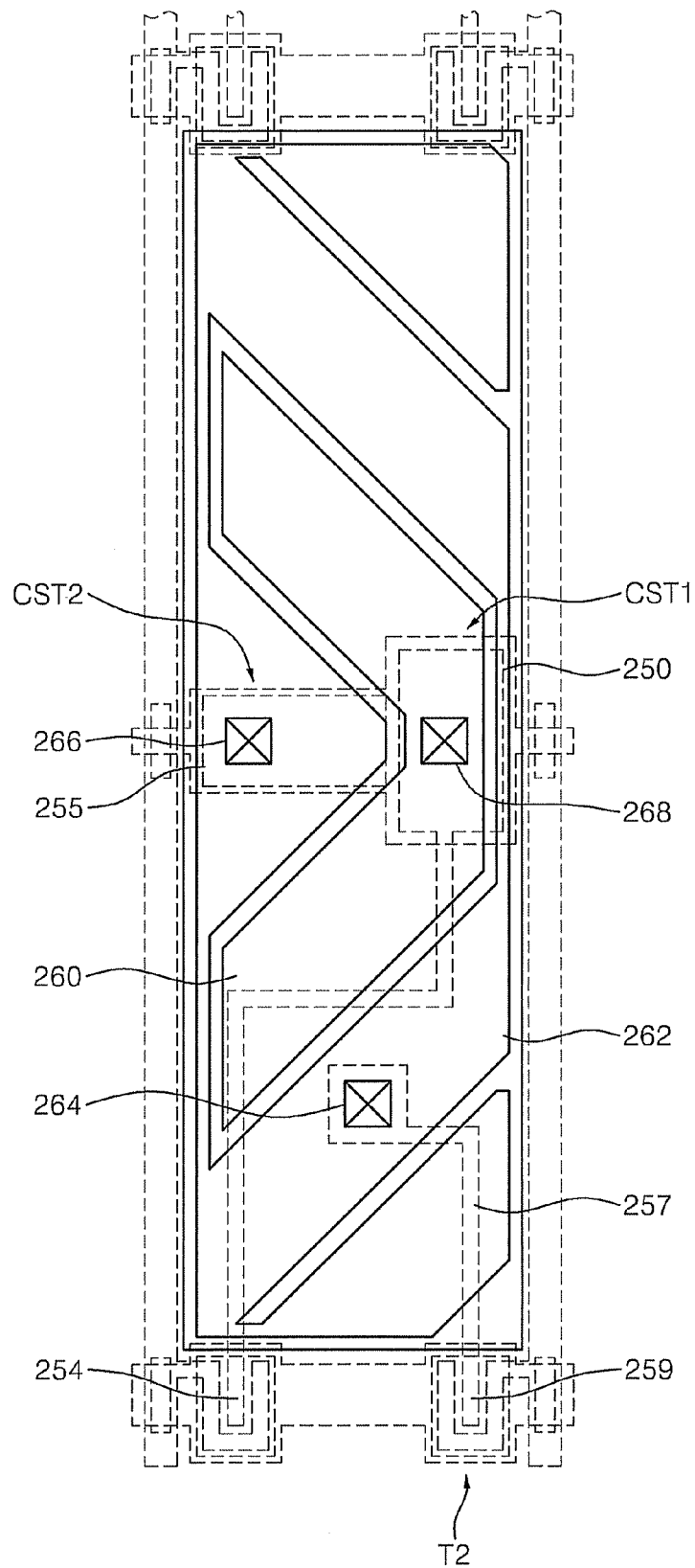

FIG. 3E shows an exemplary pixel electrode forming process. The first pixel electrode 260 and the second pixel electrode 262 are formed on the organic insulating layer 206. The first pixel electrode 260 and the second pixel electrode 262 include a transparent conductive material. The transparent conductive material includes, for example, indium tin oxide ("ITO") and/or indium zinc oxide ("IZO"). The transparent conductive material is coated on the glass substrate through a deposition process such as a sputtering process. By transparent conductive patterning through a photolithography process and an etching process using a fifth mask, the first pixel electrode 260 and the second pixel electrode 262 are formed.

The first pixel electrode 260 is connected to the upper electrode 250 of the first storage capacitor CST1 through the first contact hole 268. The second pixel electrode 262 is connected to the drain line 257 connected to the drain electrode 259 of the second TFT T2 through the second contact hole 264. The second pixel electrode 262 is also connected to the upper electrode 255 of the second storage capacitor CST2 through the third contact hole 266.

The TFT substrate according to the exemplary embodiment can be assembled with a color filter panel in which a common electrode and a color filter are formed, and can be used in a method for manufacturing the LCD device.

A structure of another exemplary pixel of the exemplary LCD device according to the exemplary embodiment of the present invention is described below in detail.

Figure 4A:
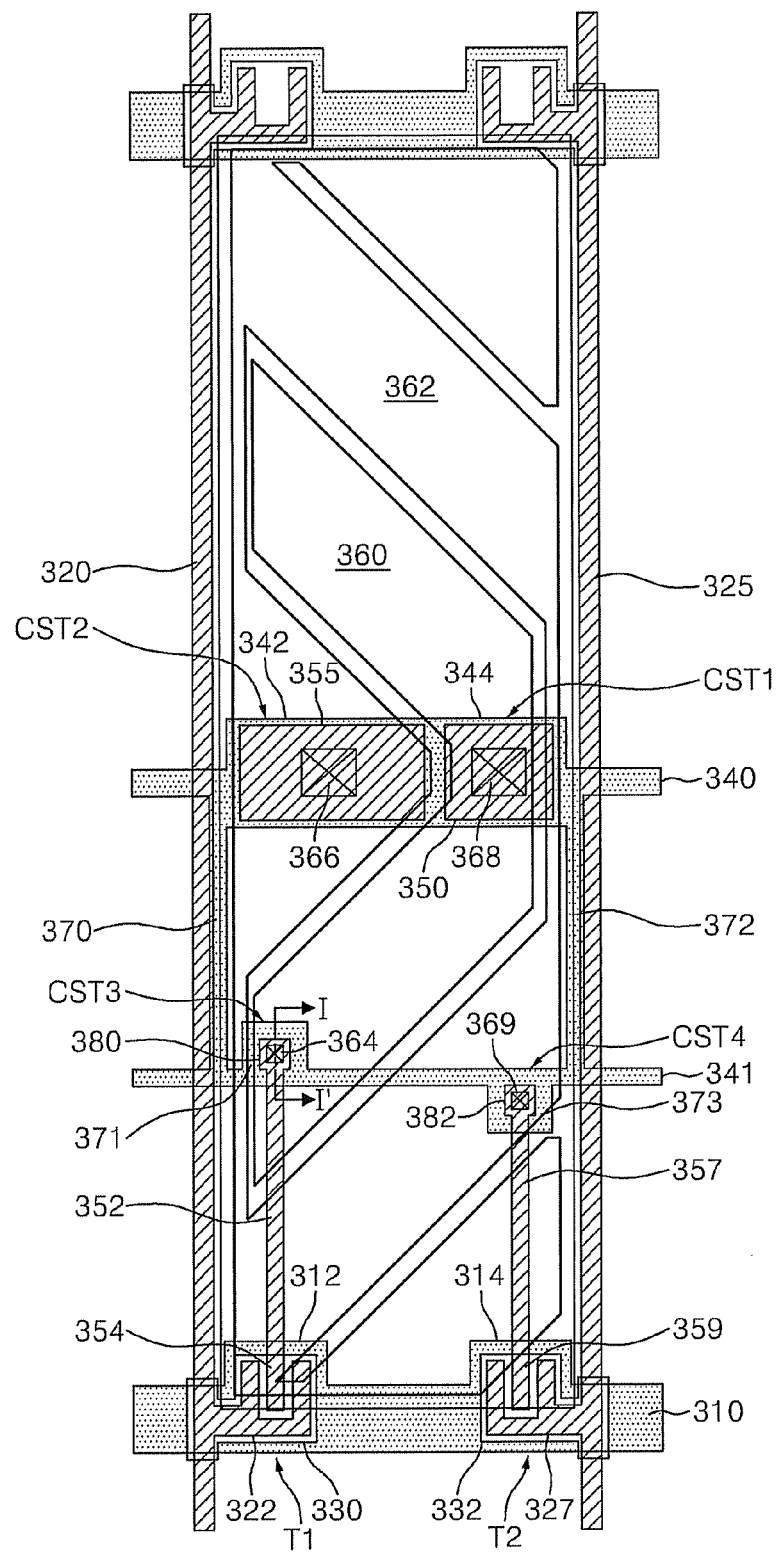
FIG. 4A is a plan view illustrating a structure of another exemplary pixel of the exemplary LCD device shown in FIG. 1.

FIG. 4A is a plan view illustrating a structure of another exemplary pixel of the exemplary LCD device shown in FIG. 1. The pixel of FIG. 4A includes first and second pixel electrodes 360 and 362, first and second TFTs T1 and T2, a gate line 310, first and second data lines 320 and 325, and first to fourth storage capacitors CST1 to CST4.

The first pixel electrode 360 is connected to a drain electrode 354 of the first TFT T1 and to an upper electrode 380 of the third storage capacitor CST3 through a contact hole 364. The first pixel electrode 360 is also connected to an upper electrode 350 of the first storage capacitor CST1 through a contact hole 368. The first pixel electrode 360 receives a high gray-scale data signal from the first data line 320 via the first TFT T1 to display the high gray-scale data signal.

The second pixel electrode 362 is separated from the first pixel electrode 360, and is formed in a shape surrounding the first pixel electrode 360. The second pixel electrode 362 is connected to the drain electrode 359 of the second TFT T2 and the fourth storage capacitor CST4 through a contact hole 369 and is also connected to an upper electrode 355 of the second storage capacitor CST2 through a contact hole 366. The second pixel electrode 362 receives a low gray-scale data signal from the second data line 325 via the second TFT T2 to display the low gray-scale data signal.

The first storage capacitor CST1 includes a lower electrode 344 connected to a first storage capacitor line 340 and an upper electrode 350 overlapped with the lower electrode 344 with an insulating layer disposed therebetween. The upper electrode 350 is connected to the first pixel electrode 360 connected to the drain electrode 354 of the first TFT T1 through the contact hole 368. The third storage capacitor CST3 includes a lower electrode 371 connected to a second storage capacitor line 341 and an upper electrode 380 overlapped with the lower electrode 371 with an insulating layer disposed therebetween. The upper electrode 380 is connected to the first pixel electrode 360 connected to the drain electrode 354 of the first TFT T1 through the contact hole 364. Therefore, the high gray-scale data signal supplied from the drain line 352 connected to the drain electrode 354 of the first TFT T1 is applied to the first pixel electrode 360 and is also accumulated in the first storage capacitor CST1.

The second storage capacitor CST2 includes a lower electrode 342 connected to the first storage capacitor line 340 and an upper electrode 355 overlapped with the lower electrode 342 with an insulating layer disposed therebetween. The upper electrode 355 of the second storage capacitor CST2 is connected to the second pixel electrode 362 connected to the drain electrode 359 of the second TFT T2 through the contact hole 366. The fourth storage capacitor CST4 includes a lower electrode 373 connected to the second storage capacitor line 341 and an upper electrode 382 overlapped with the lower electrode 373 with an insulating layer disposed therebetween. The upper electrode 382 of the fourth storage capacitor CST4 is connected to the second pixel electrode 362 connected to the drain electrode 359 of the second TFT T2 through the contact hole 369. Therefore, the low gray-scale data signal supplied from the drain line 357 connected to the drain electrode 359 of the second TFT T2 is applied to the second pixel electrode 362, and is also accumulated in the second storage capacitor CST2.

Here, the first storage capacitor line 340 and the second storage capacitor line 341 are electrically connected to each other by connecting lines 370 and 372. Preferably, the connecting lines 370 and 372 are formed so as not to be overlapped by the first and second pixel electrodes 360 and 362 so that an aperture ratio is not reduced.

As the first and second TFTs T1 and T2, the gate line 310, and the first and second data lines 320 and 325 may be substantially the same as the first and second TFTs T1 and T2, the gate line 210, and the first and second data lines 220 and 225 of the previous exemplary embodiment, a detailed description of these elements is omitted.

The third storage capacitor CST3 is described below in more detail.

Figure 4B:
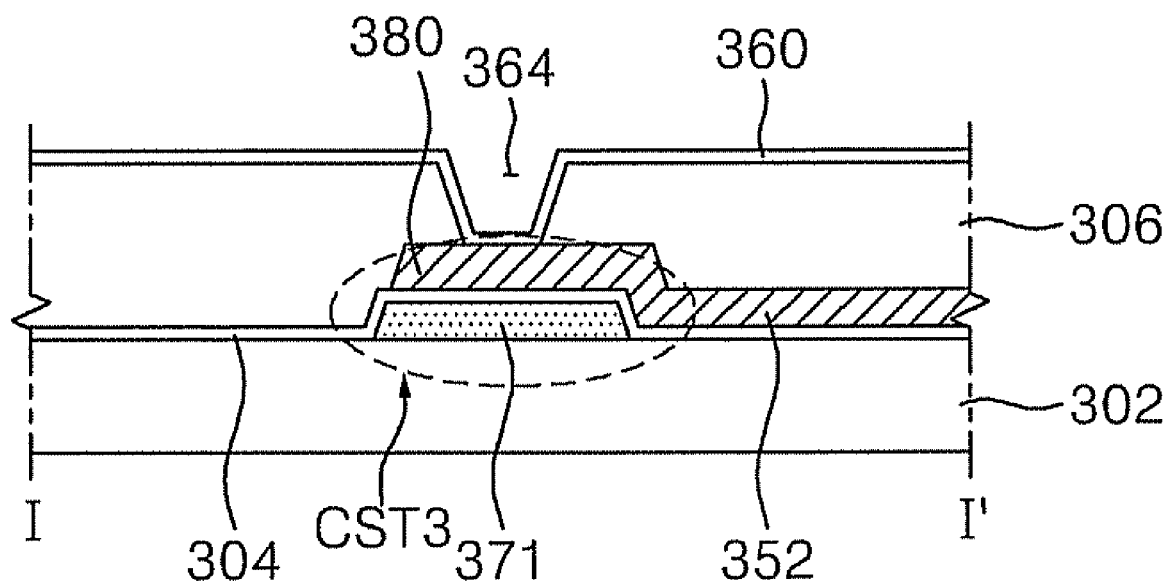
FIG. 4B is a cross-sectional view illustrating an exemplary third storage capacitor, taken along line I-I' of FIG. 4A.

FIG. 4B is a cross-sectional view illustrating an exemplary third storage capacitor CST3, taken along line I-I' of FIG. 4A.

Referring to FIG. 4B, the third storage capacitor CST3 includes the lower electrode 371 formed on a substrate 302, such as a transparent insulating substrate, such as a glass substrate, and the upper electrode 380 overlapped with the lower electrode 371 with an insulating layer 304 disposed therebetween. The upper electrode 380 is directly connected to the drain electrode 354 of the first TFT T1 through the drain line 352 and is connected to the first pixel electrode 360 through the contact hole 364 formed in a passivation film 306. The fourth storage capacitor CST4 may have substantially the same structure as the third storage capacitor CST3, and therefore a detailed description of the fourth storage capacitor CST4 is omitted.

The LCD device in accordance with an exemplary embodiment of the present invention includes the third storage capacitor CST3 connected to the drain electrode 354 of the first TFT T1 and the fourth storage capacitor CST4 connected to the drain electrode 359 of the second TFT T2. The third and fourth storage capacitors CST3 and CST4 are connected to the first and second storage capacitors CST1 and CST2 through the connecting lines 370 and 372, respectively.

In the LCD device having the structure described above, the electrostatic charges generated during a manufacturing process of an LCD device are accumulated in the third and fourth storage capacitors CST3 and CST4 before inflowing into the first and second TFTs T1 and T2 through the contact holes 364 and 369, and it is spread to the first and second storage capacitors CST1 and CST2, so that inflow paths of electrostatic charges to the first and second TFTs T1 and T2 are cut off. Accordingly, a channel short defect caused by the electrostatic charges, especially a channel short defect of a high gray-scale transistor caused by the electrostatic charges can be prevented.

FIGS. 5A to 5E are views illustrating an exemplary method for manufacturing a TFT substrate shown in FIGS. 4A and 4B. FIGS. 5A to 5E show one exemplary pixel area by way of example.

Figure 5A:
FIGS. 5A to 5E are views illustrating an exemplary method for manufacturing a TFT substrate shown in FIGS. 4A and 4B.
Figure 5A:
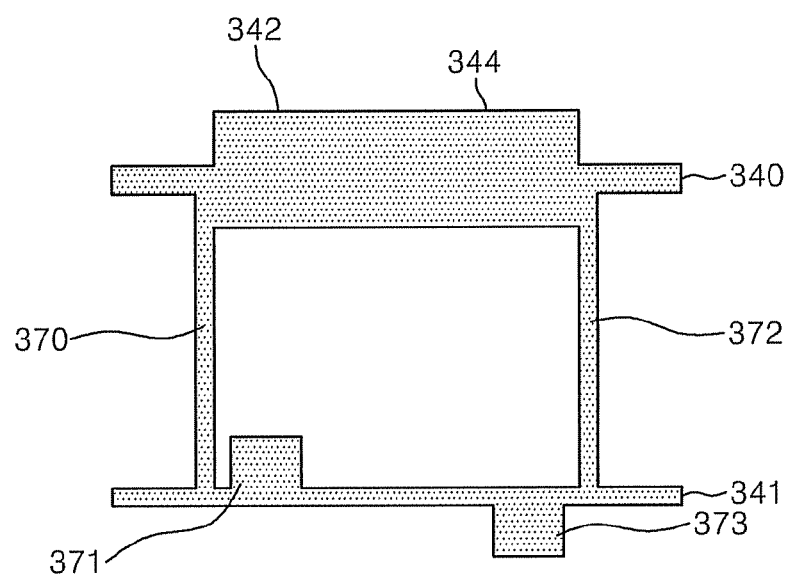
Figure 5A:
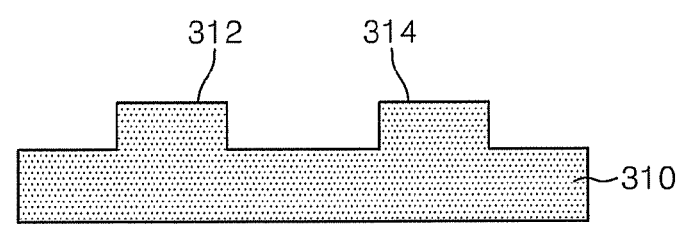

FIG. 5A shows a gate line forming process. Through the gate line forming process, the gate line 310 including the gate electrodes 312 and 314 and the first and second storage capacitor lines 340 and 341 including the lower electrodes 342 and 344 and 371 and 373 are formed on a substrate, such as a glass substrate. The first and second storage capacitor lines 340 and 341 further include connecting lines 370 and 372 for electrically insulating each other. The more detailed process is same as the gate line forming process of FIG. 3A and thus omitted.

Figure 5B:
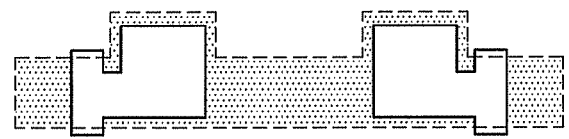
Figure 5B:
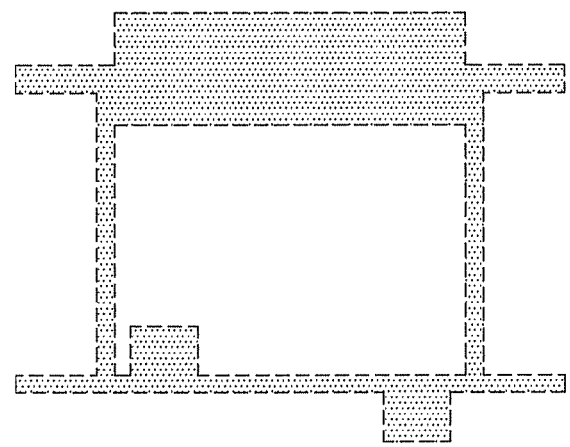
Figure 5B:
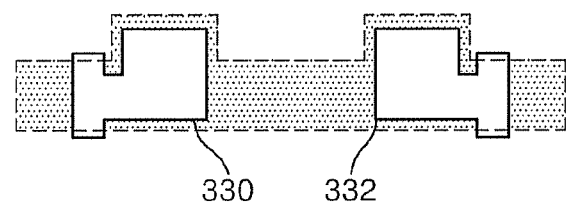

FIG. 5B shows an active layer forming process forming active layers 330, 332. The active layer forming process may be substantially the same as the active layer forming process of FIG. 3B, and thus a description of the active layer forming process with respect to FIG. 5B is omitted.

Figure 5C:
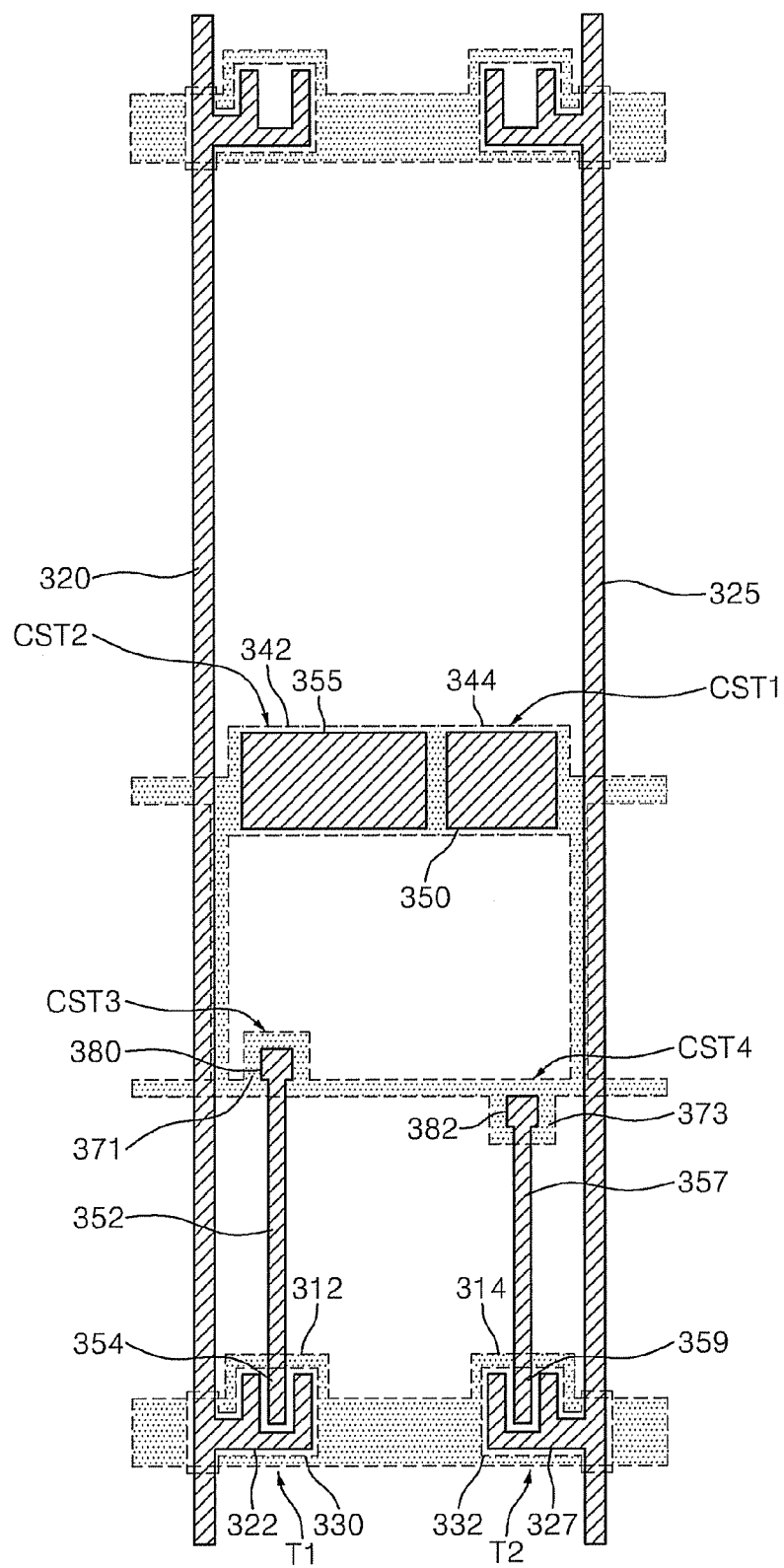

FIG. 5C shows a source/drain pattern forming process. Through the source/drain pattern forming process, a source/drain pattern is formed above the gate insulating layer on which the active layers 330 and 332 are formed. The source/drain pattern includes the first and second data line 320 and 325, the source electrodes 322 and 327 and the drain electrodes 354 and 359 of the first and second TFTs T1 and T2, the upper electrodes 350, 355, 380 and 382 of the first to fourth storage capacitors CST1 to CST4, drain lines 352 and 357 for respectively connecting the drain electrodes 354 and 359 of the first and second TFTs T1 and T2 to the upper electrodes 380 and 382 of the third and fourth storage capacitors CST3 and CST4.

The first and second data lines 320 and 325 are respectively connected to the source electrodes 322 and 327 of the first and second TFTs T1 and T2. The upper electrodes 350, 355, 380 and 382 of the first to fourth storage capacitors CST1 to CST4 are formed corresponding to the lower electrodes 344, 342, 371 and 373 of the first to fourth storage capacitors CST1 to CST4. The more detailed process is same as the source/drain pattern forming process of FIG. 3C and thus omitted.

Figure 5D:
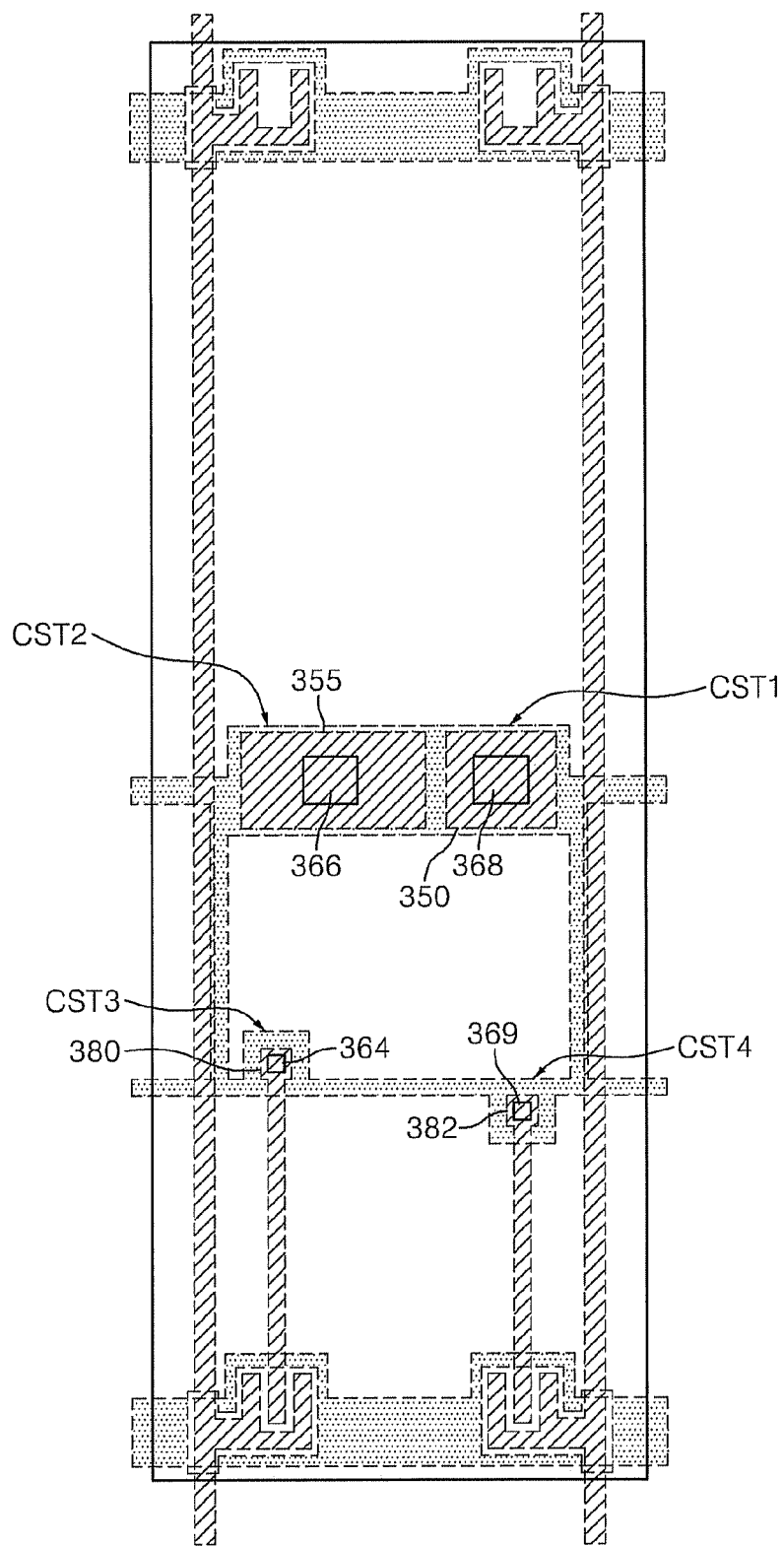

FIG. 5D shows a contact hole forming process. Through the contact hole forming process, passivation film 306, which may be an organic insulating layer, is formed above the gate insulating layer 304 on which the source/drain pattern is formed, and the first to fourth contact holes 368, 366, 364 and 369 are formed by removing parts of the passivation film 306 through a fourth mask process. The first contact hole 368 is formed to connect the upper electrode 350 of the first storage capacitor CST1 to a first pixel electrode which will be formed in the next process. The second contact hole 366 is formed to connect the upper electrode 355 of the second storage capacitor CST2 and a second pixel electrode which will be formed in the next process.

The third contact hole 364 is formed to connect the upper electrode 380 of the third storage capacitor CST3 and the first pixel electrode which will be formed in the next process. The fourth contact hole 369 is formed to connect the upper electrode 382 of the fourth storage capacitor CST4 and the second pixel electrode which will be formed in the next process. Further details regarding the contact hole forming process may be drawn by reference to the contact hole forming process described with respect to FIG. 3D.

Figure 5E:
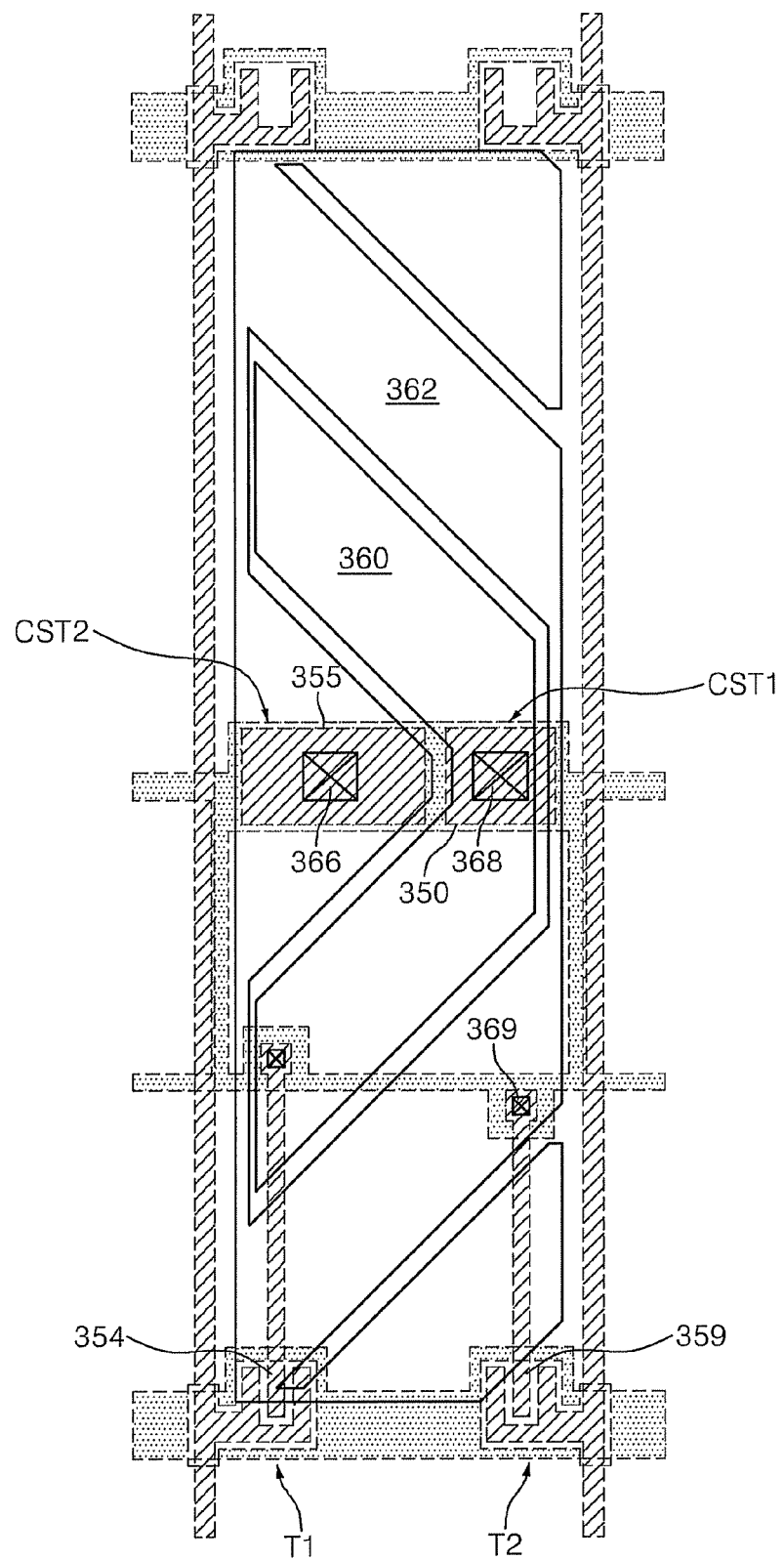

FIG. 5E shows an exemplary pixel electrode forming process. Through the pixel electrode forming process, the first and second pixel electrodes 360 and 362 of a transparent conductive pattern are formed above and on the passivation film 306. Further details regarding the pixel electrode forming process may be drawn by reference to the pixel electrode forming process described with respect to FIG. 3E.

In the pixel electrode forming process, the first pixel electrode 360 is connected to the upper electrode 350 of the first storage capacitor CST1 through the first contact hole 368 and is also connected to the drain electrode 354 of the first TFT T1 through the third contact hole 364. The second pixel electrode 362 is connected to the upper electrode 355 of the second storage capacitor CST2 through the second contact hole 366 and is also connected to the drain electrode 359 of the second TFT T2 through the fourth contact hole 369.

The TFT substrate manufactured by the above described method can be assembled with a color filter substrate having a common electrode and a color filter to manufacture an LCD device.

Figure 6:
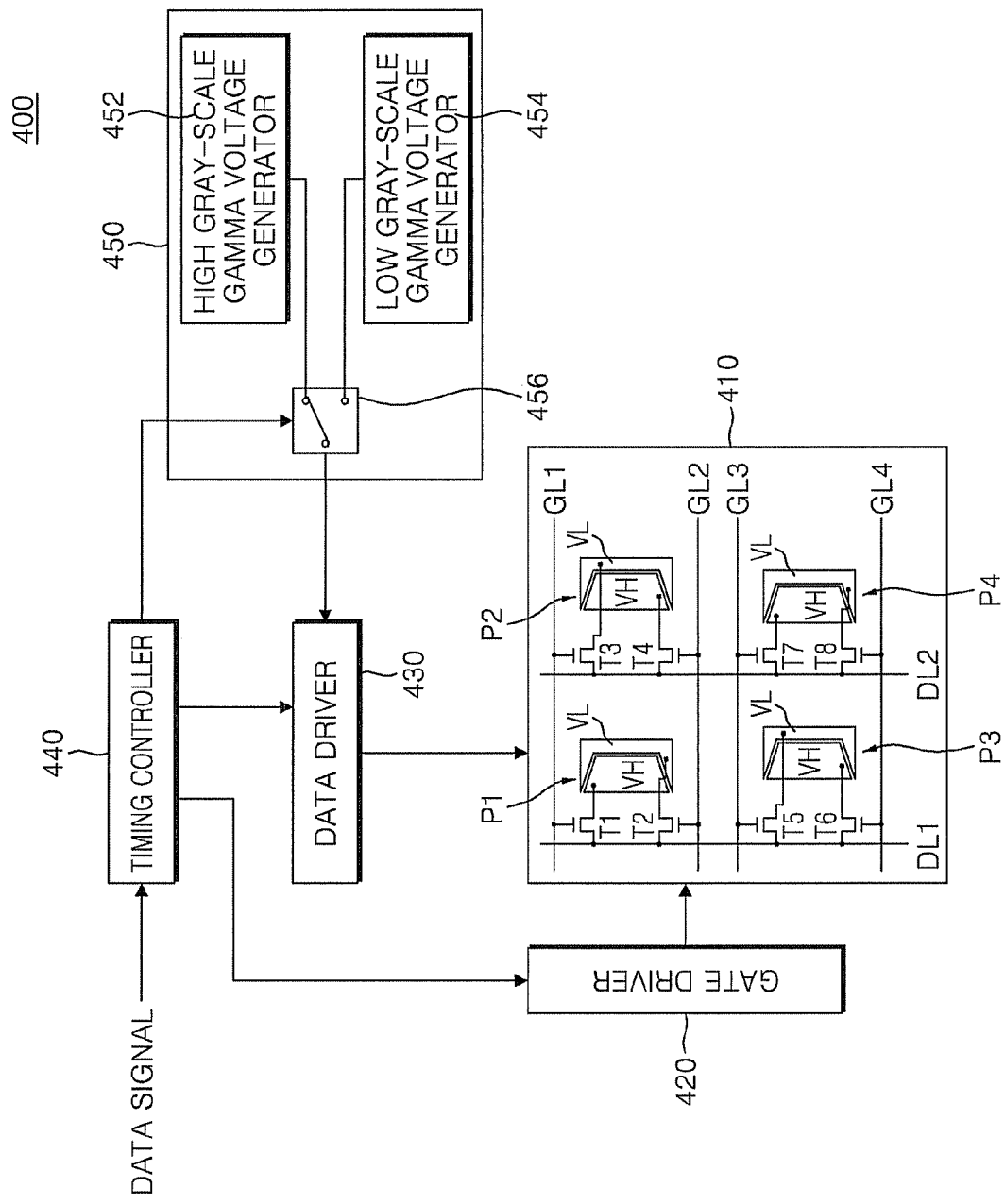
FIG. 6 is a block diagram illustrating an exemplary LCD device in accordance with another exemplary embodiment of the present invention.

FIG. 6 is a block diagram showing an exemplary LCD device in accordance with another exemplary embodiment of the present invention.

Referring to FIG. 6, an LCD device 400 includes a liquid crystal panel 410, a gate driver 420 to drive gate lines GL1 to GL4 of the liquid crystal panel 410, a data driver 430 to drive data lines DL1, DL2 of the liquid crystal panel 410, a timing controller 440 to control the gate driver 420 and the data driver 430 and a gamma voltage generator 450 to selectively supply high and low gray-scale gamma voltages.

The liquid crystal panel 410 includes a plurality of pixels P1 to P4. The pixel P1, for example, includes a first pixel electrode VH and a second pixel electrode VL which are formed in a high gray-scale area and a low gray-scale area, a first TFT T1 and a second TFT T2 which are independently connected to the first and second pixel electrodes VH and VL, the data line DL1 commonly connected to the first TFT T1 and the second TFT T2, and the gate lines GL1 and GL2 connected to the first TFT T1 and the second TFT T2. The first and second pixel electrodes VH and VL which are formed in the high and low gray-scale areas display a data signal in response to gamma voltages generated by different gamma curves.

Further details regarding the timing controller 440, the gate driver 420, the data driver 430, and the gamma voltage generator 450 may be drawn by reference to the description of the timing controller 140, the gate driver 120, the data driver 130, and the gamma voltage generator 150 of FIG. 1 and, thus a more detailed description of these elements is omitted.

A structure of an exemplary pixel of the exemplary LCD device in accordance with an alternative exemplary embodiment of the present invention will be described in detail with reference to FIG. 7.

Figure 7:
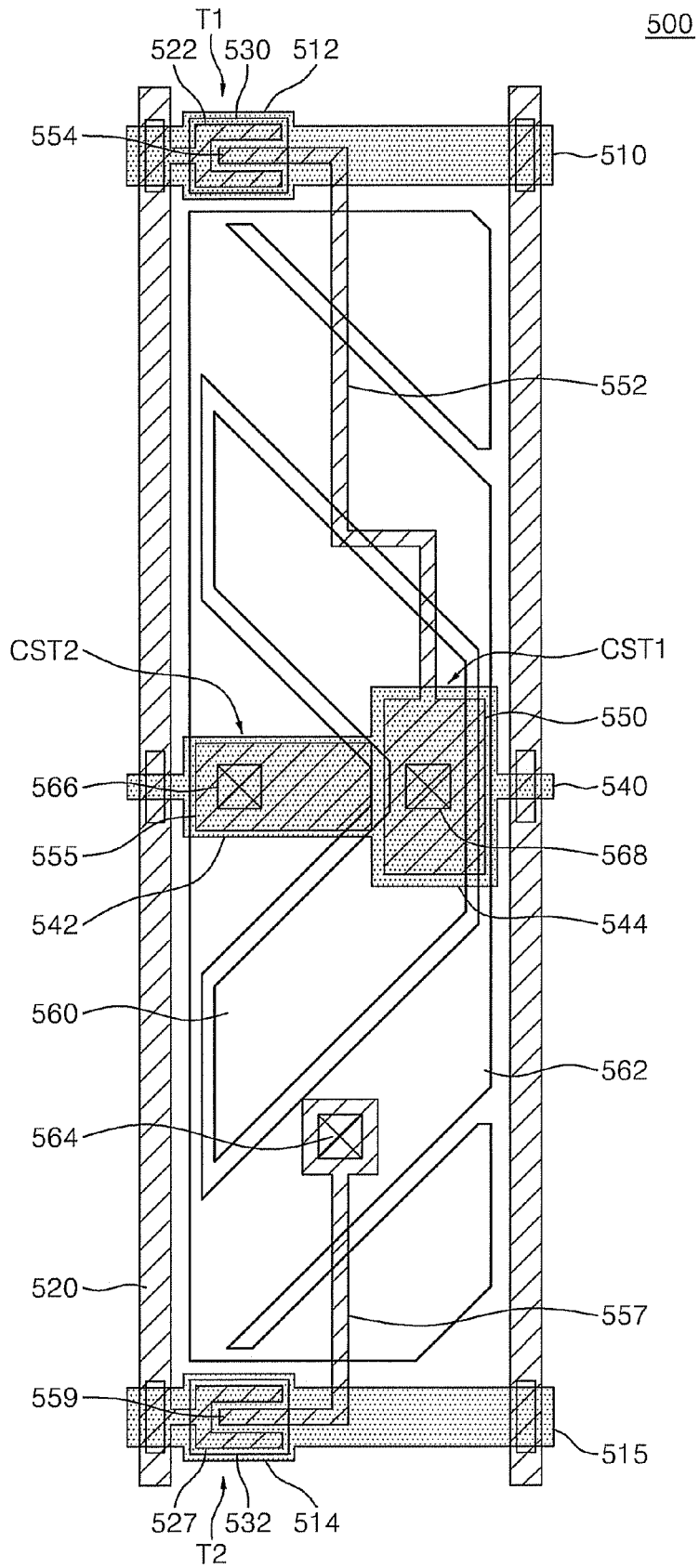
FIG. 7 is a plan view illustrating a structure of an exemplary pixel of the exemplary LCD device shown in FIG. 6.

FIG. 7 is a plan view illustrating a structure of an exemplary pixel of the exemplary LCD device shown in FIG. 6.

Referring to FIG. 7, a pixel 500 of the LCD device 400 includes a first pixel electrode 560, a second pixel electrode 562, a first TFT T1, a second TFT T2, a first gate line 510, a second gate line 515, a data line 520, a first storage capacitor CST1, and a second storage capacitor CST2.

The first pixel electrode 560 is connected to a drain electrode 554 of the first TFT T1 and an upper electrode 550 of the first storage capacitor CST1 through a contact hole 568. The first pixel electrode 560 receives a high gray-scale data signal supplied from the data line 520, and displays the high gray-scale data signal.

The second pixel electrode 562 is separated from the first pixel electrode 560 and surrounds the first pixel electrode 560. The second pixel electrode 562 is connected to a drain electrode 559 of the second TFT T2 through a contact hole 564, and is also connected to an upper electrode 555 of the second storage capacitor CST2 through a contact hole 566. The second pixel electrode 562 receives a low gray-scale data signal supplied from the data line 520 through the second TFT T2, and displays the low gray-scale data signal.

The first TFT T1 includes a gate electrode 512 connected to the first gate line 510, a source electrode 522 connected to the data line 520, a drain electrode 554 connected to the drain line 552, an active layer 530 overlapped with the gate electrode 512 with an insulating layer disposed therebetween.

In response to the gate driving signal supplied from the first gate line 410, the first TFT T1 provides the high gray-scale data signal supplied from the data line 520 to the drain line 552 through the drain electrode 554 during a ½ horizontal period.

The second TFT T2 includes a gate electrode 514 connected to the second gate line 515, a source electrode 527 connected to the data line 520, a drain electrode 559 connected to the drain line 557, and an active layer 532 overlapped with the gate electrode 514 with an insulating layer disposed therebetween.

In response to the gate driving signal supplied from the second gate line 515, the second TFT T2 provides the high gray-scale data signal supplied from the data line 520 to the drain line 557 through the drain electrode 559 during a remaining ½ horizontal period.

The first gate line 510 is connected to the gate electrode 512 of the first TFT T1. The first gate line 510 provides the gate driving signal outputted from the gate driver 420 to the gate electrode 512 of the first TFT T1 during a ½ horizontal period.

The second gate line 515 is connected to the gate electrode 514 of the second TFT T2. The second gate line 515 provides the gate driving signal outputted from the gate driver 420 to the gate electrode 514 of the second TFT T2 during a remaining ½ horizontal period.

The data line 520 is formed at a first side of the pixels, and intersects the first and second gate lines 510 and 515. The data line 520 is connected to the source electrode 522 of the first TFT T1 and the source electrode 527 of the second TFT T2. The data line 520 provides the high gray-scale data signal outputted from the data driver 430 to the source electrode 522 of the first TFT T1 during a ½ horizontal period, and provides the low gray-scale data signal outputted from the data driver 430 to the source electrode 527 of the second TFT T2 during a remaining ½ horizontal period.

The first storage capacitor CST1 includes a lower electrode 544 connected to the storage capacitor line 540 and the upper electrode 550 overlapped with the lower electrode 544 with an insulating layer disposed therebetween. The upper electrode 550 is directly connected to the drain electrode 454 of the first TFT T1 through the drain line 552. The lower electrode 544 and the upper electrode 550 of the first storage capacitor CST1 have a larger area than that of a lower electrode 542 and the upper electrode 555 of the second storage capacitor CST2.

The upper electrode 550 connected to the drain line 552 is connected to the first pixel electrode 560 through the contact hole 568. Accordingly, the high gray-scale data signal supplied from the drain line 552 connected to the drain electrode 554 of the first TFT T1 can be applied to the first pixel electrode 560, and can be stored in the first storage capacitor CST1 at the same time.

The second storage capacitor CST2 includes the lower electrode 542 connected to the storage capacitor line 540 and the upper electrode 455 overlapped with the lower electrode 542 with an insulating layer disposed therebetween. The upper electrode 555 is connected to the second pixel electrode 562, which is connected to the drain electrode 459 of the second TFT T2, through the contact hole 566. Accordingly, the low gray-scale data signal supplied from the drain line 557 connected to the drain electrode 559 of the second TFT T2 can be applied to the second pixel electrode 462, and can be stored in the second storage capacitor CST2.

According to exemplary embodiments of the present invention, the LCD device has a structure in which the contact hole for directly connecting the first pixel electrode 560 to the drain electrode 554 of the first TFT T1 is not formed and the drain electrode 554 of the first TFT T1 is directly connected to the upper electrode 550 of the first storage capacitor CST1. Thus, the electrostatic charges generated during a manufacturing process of an LCD can be accumulated in the first storage capacitor CST1 before inflowing into the first TFT T1, so that an inflow path of electrostatic charges to the first TFT T1 is cut off.

Accordingly, since a structure in which the drain electrode of the transistor which switches the high gray-scale data signal to the upper electrode of the storage capacitor is provided, a channel short defect caused by the electrostatic charge, especially a channel short defect of a high gray-scale transistor caused by the static electricity can be reduced.

Although exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A liquid crystal display device, comprising:
    a first thin film transistor supplying a first data signal supplied from a first data line to a first pixel electrode;
    a first storage capacitor having an electrode connected to the first pixel electrode through a first contact hole and connected to the first thin film transistor, the first storage capacitor storing the first data signal;
    a second thin film transistor supplying a second data signal supplied from a second data line to a second pixel electrode through a second contact hole; and
    a second storage capacitor having an electrode connected to the second pixel electrode through a third contact hole, the second storage capacitor storing the second data signal.

2. The liquid crystal display device of claim 1, wherein the first data signal and the second data signal are generated by different gamma curves.

3. The liquid crystal display device of claim 2, wherein the first thin film transistor comprises a source electrode connected to the first data line and a drain electrode directly connected to the electrode of the first storage capacitor.

4. The liquid crystal display device of claim 3, wherein the second thin film transistor comprises a source electrode connected to the second data line and a drain electrode connected to the second pixel electrode.

5. The liquid crystal display device of claim 4, wherein a capacitance of the first storage capacitor is greater than a capacitance of the second storage capacitor.

6. The liquid crystal display device of claim 5, wherein the first thin film transistor provides the first data signal to the first pixel electrode during a portion of one horizontal period, and the second thin film transistor provides the second data signal to the second pixel electrode during a remaining portion of the horizontal period.

7. The liquid crystal display device of claim 1, wherein the electrode of the first storage capacitor is integrally connected to a drain electrode of the first thin film transistor.

8. The liquid crystal display device of claim 1, wherein a channel short defect of the first thin film transistor caused by electrostatic charges is reduced by storing the electrostatic charges in the first storage capacitor before inflowing into the first thin film transistor.

9. A liquid crystal display device, comprising:
    a data driver supplying a first data signal to a first data line and supplying a second data signal to a second data line;
    a gate driver supplying a gate driving signal to a gate line;
    a first thin film transistor supplying the first data signal to a first pixel electrode in response to the gate driving signal;
    a first storage capacitor connected to the first pixel electrode through a first contact hole and directly connected to the first thin film transistor, the first storage capacitor storing the first data signal;
    a second thin film transistor supplying a second data signal to a second pixel electrode through a second contact hole in response to the gate driving signal; and
    a second storage capacitor connected to the second pixel electrode through a third contact hole, the second storage capacitor storing the second data signal.

10. The liquid crystal display device of claim 9, wherein the first data signal and the second data signal are generated by different gamma curves.

11. The liquid crystal display device of claim 10, further comprising:
    a gamma voltage generator supplying a first gray-scale gamma voltage to generate the first data signal and a second gray-scale gamma voltage to generate the second data signal to the data driver.

12. The liquid crystal display device of claim 11, wherein the data driver provides the first data signal to the first thin film transistor during a portion of a horizontal period, and provides the second data signal to the second thin film transistor during a remaining portion of the horizontal period, and the gate driver provides the gate driving signal to the first thin film transistor and the second thin film transistor during the horizontal period.

13. The liquid crystal display device of claim 9, wherein an electrode of the first storage capacitor is integrally connected to a drain electrode of the first thin film transistor, and a channel short defect of the first thin film transistor caused by electrostatic charges is reduced by storing the electrostatic charges in the first storage capacitor before inflowing into the first thin film transistor.

14. A liquid crystal display device, comprising:
    a plurality of pixels connected to a plurality of first data lines to transmit a first data signal, connected to a plurality of second data lines to transmit a second data signal, and connected to a plurality of gate lines to transmit a gate driving signal, wherein at least one pixel among the plurality of pixels comprises:
    a first pixel electrode displaying a first data signal;
    a first thin film transistor supplying the first data signal to the first pixel electrode;
    a first storage capacitor connected to the first pixel electrode through a first contact hole and directly connected to the first thin film transistor, the first storage capacitor storing the first data signal;
    a second pixel electrode displaying the second data signal;
    a second thin film transistor connected to the second pixel electrode through a second contact hole, the second thin film transistor supplying the second data signal to the second pixel electrode; and
    a second storage capacitor connected to the second pixel electrode through a third contact hole, the second storage capacitor storing the second data signal.

15. The liquid crystal display device of claim 14, wherein the first data signal and the second data signal are generated by different gamma curves.

16. The liquid crystal display device of claim 15, wherein the first storage capacitor comprises:
    a first electrode;

a second electrode connected to the first thin film transistor and the first pixel electrode; and an insulating layer formed between the first electrode and the second electrode.

17. The liquid crystal display device of claim 16, wherein the second storage capacitor comprises:

a third electrode connected to the first electrode;

a fourth electrode connected to the second pixel electrode; and an insulating layer formed between the third electrode and the fourth electrode.

18. The liquid crystal display device of claim 17, wherein the first storage capacitor comprises the first electrode and the second electrode having a larger area than an area of the third electrode and the fourth electrode of the second storage capacitor, respectively.

19. The liquid crystal display device of claim 14, wherein the second pixel electrode is separated from the first pixel electrode and surrounds the first pixel electrode.

20. A method for manufacturing a liquid crystal display device, the method comprising:

forming a gate line having a first gate electrode and a second gage electrode and a storage capacitor line having a first electrode and a third electrode on a substrate;

forming a gate insulating layer to cover the gate line and the storage capacitor line;

forming an first active layer and an second active layer on the gate insulating layer, the first active layer overlapped with the first gate electrode and the second active layer overlapped with the second gate electrode;

forming a source/drain pattern, wherein the source/drain pattern comprises:

a first data line formed on the gate insulating layer to transmit a first data signal;

a first source electrode and a first drain electrode formed on the first active layer and connected to the first data line;

a second electrode formed on the gate insulating layer and opposite to the first electrode;

a first drain line connecting the first drain electrode with the second electrode;

a second drain line formed on the gate insulating layer to transmit a second data signal;

a second source electrode and a second drain electrode formed on the second active layer and connected to the second data line; and a fourth electrode on the gate insulating layer and opposite to the third electrode;

forming an organic insulating layer on the source/drain pattern;

forming a first contact hole to expose the second electrode by removing a portion of the organic insulating layer, a second contact hole to expose the second drain by removing a portion of the organic insulating layer, and a third contact hole to expose the fourth electrode by removing a portion of the organic insulating layer; and forming a first and second pixel electrodes on the organic insulating layer in which the first, second, and third contact holes are formed, wherein the first pixel electrode receives the first data signal and a second pixel electrode receives the second data signal.

21. The method of claim 20, wherein the first pixel electrode is connected to the second electrode through the first contact hole, and the second pixel electrode is connected to the second drain line through the second contact hole and to the fourth electrode through the third contact hole.

22. The method of claim 21, wherein the first electrode has a larger area than an area of the third electrode, and the second electrode has a larger area than an area of the fourth electrode.

23. A method for manufacturing a liquid crystal display device, the method comprising:

forming a gate line on a substrate, the gate line comprising gate electrodes having a first gate electrode and a second gate electrode and a storage capacitor line having a first electrode and a second electrode;

forming a gate insulating layer on the gate line and the storage line;

forming an active layer on the substrate, the active layer overlapped with the first gate electrode and the second gate electrode;

forming a source/drain pattern, wherein the source/drain pattern comprises:

a first data line and second data line formed on the gate insulating layer to transmit a first data signal and a second data signal, respectively;

a first source electrode and a first drain electrode formed on the active layer and connected to the first data line;

a second source electrode and a second drain electrode formed on the active layer and connected to the second data line;

a third electrode and a fourth electrode formed on the first active layer and opposite to the first electrode and the second electrode, respectively; and a drain line connected to the first drain electrode and the third electrode;

forming an organic insulating layer on the source/drain pattern;

forming a first contact hole to expose the third electrode, a second contact hole to expose a drain line connected to the second drain electrode, and a third contact hole to expose the fourth electrode by removing a part of the organic insulating layer; and forming a first and a second pixel electrodes on areas where the first, second, and third contact holes are formed wherein the first pixel electrode receives the first data signal and connected to the third electrode through the first contact hole, and the second pixel electrode receives the second data signal and connected to the drain line connected to the second drain electrode through the second contact hole and to the fourth electrode through the third contact hole.

* * * * *